(12) United States Patent
Rico

(10) Patent No.: US 11,871,700 B2
(45) Date of Patent: Jan. 16, 2024

(54) SYSTEM FOR CLEANING A FLOW OF HARVESTED CROP

(71) Applicant: CNH Industrial America LLC, New Holland, PA (US)

(72) Inventor: Vincent Rico, La Roche-sur-Yon (FR)

(*) Notice: Subject to any disclaimer, the term of this patent is extended or adjusted under 35 U.S.C. 154(b) by 0 days.

(21) Appl. No.: 17/051,164

(22) PCT Filed: Apr. 26, 2019

(86) PCT No.: PCT/EP2019/060805
§ 371 (c)(1),
(2) Date: Oct. 27, 2020

(87) PCT Pub. No.: WO2019/207139
PCT Pub. Date: Oct. 31, 2019

(65) Prior Publication Data
US 2021/0051851 A1    Feb. 25, 2021

(30) Foreign Application Priority Data
Apr. 27, 2018 (EP) .................................. 18305540

(51) Int. Cl.
*A01D 46/28* (2006.01)
(52) U.S. Cl.
CPC ................... *A01D 46/285* (2013.01)
(58) Field of Classification Search
CPC ............. A23N 15/02; A23N 15/025; A23N 2015/006; A01D 46/285; A01D 46/28;
(Continued)

(56) References Cited

U.S. PATENT DOCUMENTS 3,596,716 A * 8/1971 Hoffman ............. A01D 33/04
171/17
4,282,705 A * 8/1981 Fontan ............... A01D 46/285
56/16.5
(Continued)

FOREIGN PATENT DOCUMENTS

DE  3416549 C2 * 9/1994 ............. A01D 46/02
EP  2704549 B1     8/2017
(Continued)

OTHER PUBLICATIONS

Extended European Search Report for EP application 18305540.9, dated Oct. 31, 2018 (8 pages).

*Primary Examiner* — Thomas B Will
*Assistant Examiner* — Madeline I Runco
(74) *Attorney, Agent, or Firm* — Peter K. Zacharias

(57) ABSTRACT

A system for cleaning a flow of harvested crop, including a conveyor to convey the flow downstream of the conveyor into a cleaning zone into which the flow is discharged, and a cleaning unit located above the cleaning zone and operable to generate an upward air flow through the cleaning zone for extracting residues contained in the discharged flow. The system further includes at least two conveying rolls that are disposed behind a downstream end of the conveyor in an upstream part of the cleaning zone to be fed with the flow of harvested crop discharged from the conveyor. The conveying rolls are arranged to convey the crop flow and to discharge it into a downstream part of the cleaning zone. Passages are formed between or through the rolls, and are arranged to allow an upward air flow therethrough for extracting residues from the crop present on the conveying rolls.

19 Claims, 3 Drawing Sheets

Figure 1:
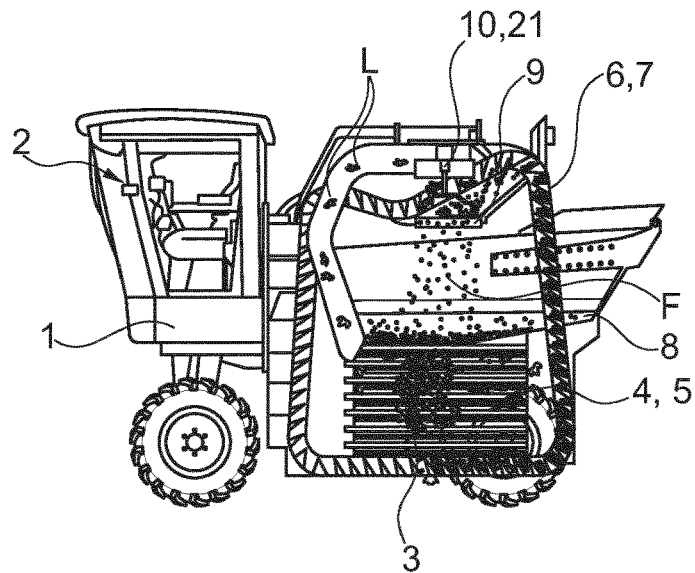

(58) Field of Classification Search
CPC ........ A01D 33/02; A01D 46/00–46/30; A01D 45/10; A01D 29/00
See application file for complete search history.

(56) References Cited

U.S. PATENT DOCUMENTS

| | | | | | |
|---|---|---|---|---|---|
| 4,959,038 | A | * | 9/1990 | Ragsdale | ................ A01F 11/00 460/100 |
| 5,001,893 | A | * | 3/1991 | Stanley | ................ A01D 51/002 56/16.5 |
| 6,990,794 | B2 | * | 1/2006 | Merant | ................ A01D 46/00 56/328.1 |
| 7,166,027 | B2 | * | 1/2007 | Messenger | ........... A01D 46/285 460/114 |
| 8,180,497 | B2 | * | 5/2012 | Berthet | ................. A01D 46/28 700/283 |
| 8,216,035 | B2 | * | 7/2012 | Ravineau | ............ A01D 46/285 460/142 |
| 8,642,910 | B2 | * | 2/2014 | Pellenc | ................ A01D 46/285 209/576 |
| 8,683,918 | B1 | * | 4/2014 | Witham | ............... A23N 12/005 99/640 |
| 9,265,279 | B2 | * | 2/2016 | Le Neve | ............... A23N 15/02 |
| 9,357,694 | B2 | * | 6/2016 | Kalverkamp | ........... A01D 33/04 |
| 9,579,692 | B2 | * | 2/2017 | Le Neve | ................... B07B 4/08 |
| 10,124,370 | B2 | * | 11/2018 | Pellenc | ................... A23N 15/02 |
| 2012/0131894 | A1 | * | 5/2012 | Pellenc | ..................... B07B 1/15 56/328.1 |
| 2017/0339828 | A1 | * | 11/2017 | Holly | ................... A01D 45/003 |
| 2018/0249632 | A1 | * | 9/2018 | Morris | ................ A01D 61/002 |

FOREIGN PATENT DOCUMENTS

| | | | | | |
|---|---|---|---|---|---|
| FR | | 2448280 | A1 * | 9/1980 | ............ A01D 46/285 |
| FR | | 2868663 | A1 * | 10/2005 | ............. A01D 46/28 |
| WO | WO-2010012936 | A2 * | 2/2010 | ........... A23N 15/025 |
| WO | | 2017027912 | A1 | 2/2017 | |

* cited by examiner

SYSTEM FOR CLEANING A FLOW OF HARVESTED CROP

The invention relates to a system for cleaning a flow of harvested crop, an assembly for processing a flow of harvested crop that comprises such a system, and a harvesting machine comprising a harvesting unit and such a system, in particular included in such a processing assembly.

The invention applies to the field of mechanized harvesting of fruits growing on trees or bushes, especially berries such as grapes, raspberries, red, white or blackcurrants, and other fruits growing in bunches.

Fruits are conventionally harvested by a harvesting machine comprising a motorised support structure which is movable along rows of plants, a harvesting unit being mounted on said structure for straddling at least one of said rows of plants and harvesting fruits from said row, in particular by means of a shaker system implemented in said harvesting unit. Then, the harvested crop is conveyed inside the machine to be stored in at least one hopper provided for that purpose on the machine or in a trailer attached to or travelling next to the harvesting machine.

However, because of the action of the shaker system, the harvested crop includes, in addition to detached fruit, material other than fruit, comprising among other things, juice, leaves, wood particles, bunches of fruits of various sizes.

To eliminate material other than fruit, in particular residue such as leaves and wood particles, harvesting machines further include a suction cleaning unit which is arranged to generate an air flow for extracting of said residue from the harvested crop before its storage.

In particular, systems are known, which comprise a conveyor arranged to convey a flow of harvested crop to be cleaned downstream of said conveyor into a cleaning zone wherein said flow is intended to be discharged, a suction cleaning unit as described hereinabove being located above said cleaning zone and operable to generate an air flow through said cleaning zone for extracting residue contained in said discharged flow. Such systems are known from, e.g., WO 2012/150354 A1 and WO 2017/027912 A1.

However, such systems may encounter some problems when the harvesting machine is working in high yield conditions. Indeed, the conveyor may then have to convey a flow of harvested crop with a substantial height and density, wherein different materials are in particular piled up on each other, material to be extracted by suction, for example leaves, being jammed under detached berries and/or bunches.

Thus, at the downstream end of the conveyor, i.e., when entering the cleaning zone, a flow of harvested crop with such height and density may be incorrectly discharged by said conveyor, in particular in irregular and very compact piles of materials wherein material to be extracted by suction may be jammed as explained hereinabove, which can affect the quality of the cleaning performed by the suction cleaning unit, and thus the general quality of the harvested crop.

The invention aims to improve the prior art by proposing a system for cleaning a flow of harvested crop which is arranged to improve the extraction capacity of residue material from said crop flow by the suction cleaning unit.

For that purpose, and according to a first aspect, the invention relates to a system for cleaning a flow of harvested crop, said system comprising a conveyor arranged to convey said flow downstream of said conveyor into a cleaning zone wherein said flow is intended to be discharged, and a suction cleaning unit located above said cleaning zone and operable to generate an upward air flow through said cleaning zone for extracting residues contained in said discharged flow, said system further comprising at least two conveying rolls that are disposed behind the downstream end of the conveyor in an upstream part of the cleaning zone in order to be fed with the flow of harvested crop discharged from the conveyor, said conveying rolls being arranged to convey said crop flow and to discharge it into a downstream part of the cleaning zone, wherein passages are formed between or through said rolls, said passages being arranged to allow an upward air flow therethrough for extracting residues from the crop present on the conveying rolls.

According to a second aspect, the invention relates to an assembly for processing a flow of harvested crop, said assembly comprising such a system for cleaning said harvested crop, as well as a second conveyor arranged underneath the cleaning zone and which is arranged to convey the cleaned crop flow along a direction different from the conveying directions of the conveyor.

According to a third aspect, the invention relates to a harvesting machine comprising a harvesting unit, as well as such a system for cleaning a flow of harvested crop provided by said harvesting unit, said cleaning system possibly being included in such a processing assembly.

Figure 2A:
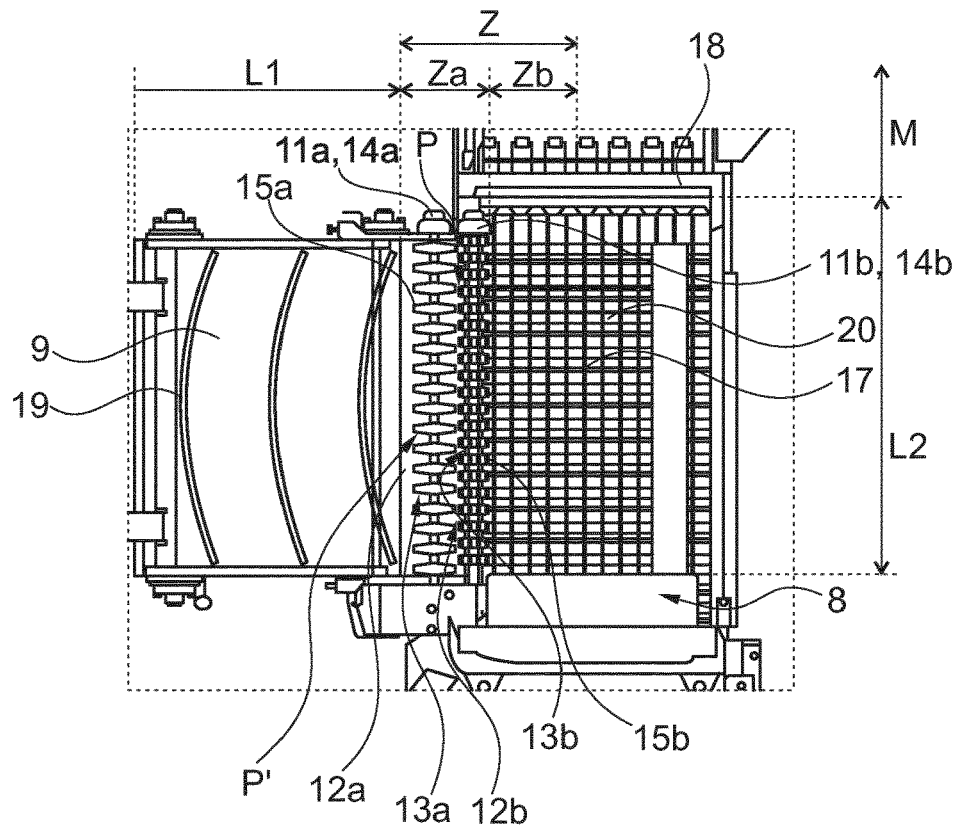
Figure 2B:
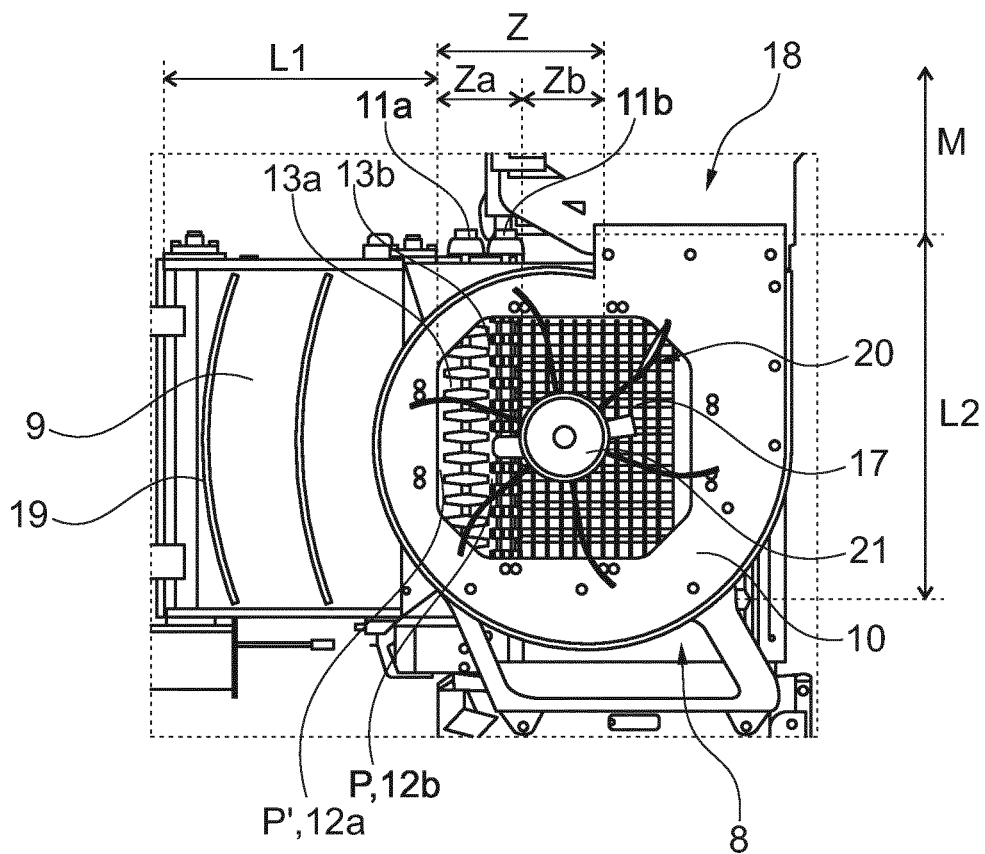
Figure 2C:
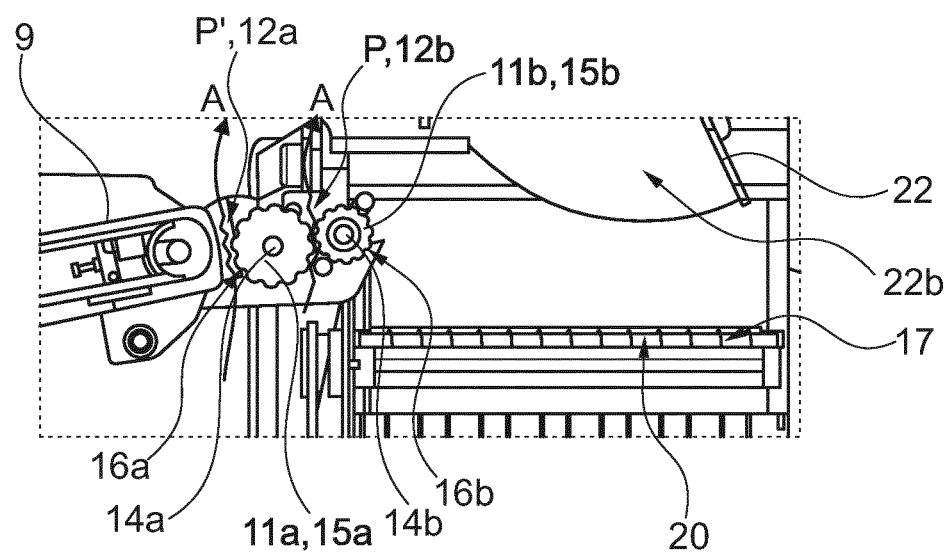
Figure 3:
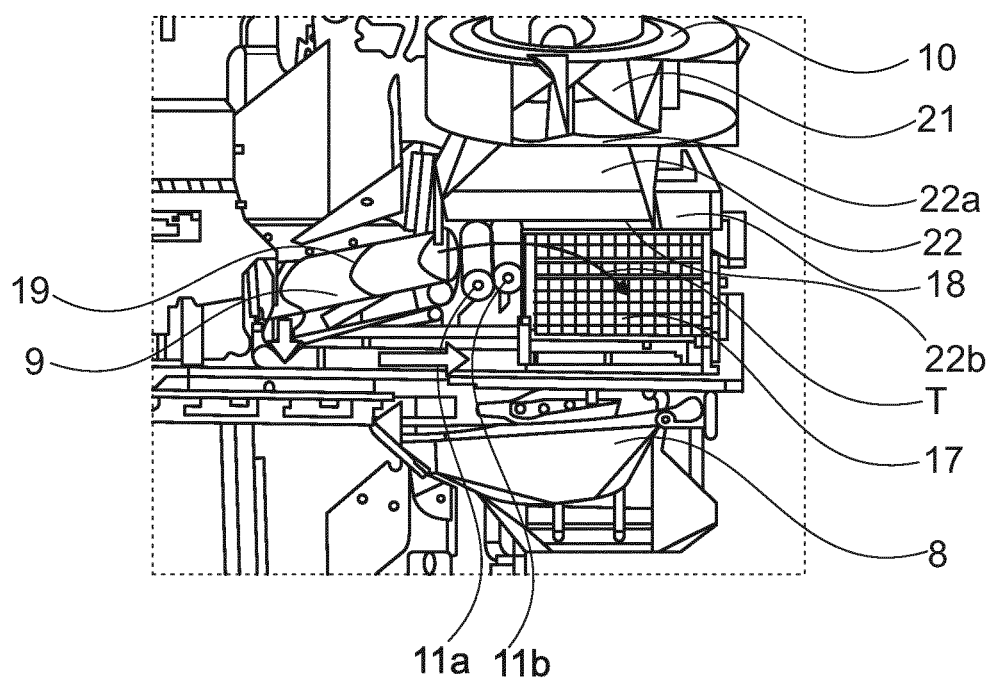

Other aspects and advantages of the invention will become apparent in the following description made with reference to the accompanying figures, wherein:

FIG. 1 represents a side view of a harvesting machine according to the invention;

FIGS. 2a, 2b and 2c schematically represent a processing assembly comprising a system for cleaning crop according to an embodiment of the invention, respectively in a top view without (FIG. 2a) and partially with the suction cleaning unit (FIG. 2b), and in a side view (FIG. 2c);

FIG. 3 schematically represents in perspective a processing assembly as shown in FIGS. 2a, 2b and 2c, along with other elements implemented in a harvesting machine.

With reference to these figures, we describe below a system for cleaning a flow of harvested crop, an assembly for processing a flow of harvested crop that comprises such a cleaning system, and a harvesting machine comprising a harvesting unit 4 and such a cleaning system, possibly included in such a processing assembly.

The harvesting machine is in particular operable for the selective and mechanical harvesting of fruits growing on plants, such as trees or bushes, which are arranged in rows, and more particularly to berries, such as grapes, raspberries, red, white or blackcurrants, and other fruits growing in bunches.

To this end, the harvesting machine comprises a motorized support structure 1, which is equipped with a driver station 2 and which is movable along rows of plants 3, a harvesting unit 4 being mounted inside said structure for straddling at least one of said rows of plants and detaching fruits F from said plants.

In particular, the harvesting unit 4 can be mounted onto the support structure 1 permanently or removably, so as to be replaceable by other equipment and accessories, for example spraying equipment, pruning equipment or equipment for working the soil.

The harvesting unit 4 includes a straddling chassis which delimits a harvesting tunnel into which the plants 3 are successively introduced to move through said tunnel between respective openings at the front and at the rear of said tunnel. Moreover, the harvesting unit 4 includes a shaker system including two shaker devices 5, said shaker devices being arranged on respective sides of the harvesting tunnel to delimit said tunnel transversely.

The harvesting machine also includes a unit 6 for continuously recovering the crop detached by the harvesting unit 4, which comprises in particular, in addition to the detached fruit, stalks, juice, leaves L, pieces of wood, bunches of varied sizes. In one embodiment, the recovering unit 6 comprises at least one bucket conveyor 7 adapted to recover the harvested crop under the harvesting unit 4 and to convey said crop to an upper portion of the machine, in particular for the storage of said crop in at least one hopper 8 provided for that purpose.

For ensuring the best quality of the crop, especially in the context of vinification of grapes, it is desirable to extract the residues contained in the flow of harvested crop, in particular green residues such as stalks, leaves L, branches and pieces of wood.

To this end, the harvesting machine comprises a system embedded on the upper portion of the support structure 1 for cleaning a flow of harvested crop coming directly from the recovery unit 6, said system comprising a conveyor 9 arranged to convey said flow downstream of said conveyor into a cleaning zone Z into which said flow is intended to be discharged, and a suction cleaning unit 10 located above said cleaning zone and operable to generate an upstream air flow through said cleaning zone for extracting such residues contained in the discharged flow, before the storage of said flow in the hopper 8 or in an ancillary trailer.

As represented in particular in FIG. 3, the suction cleaning unit 10 typically comprises a ventilator 21 and a hood 22 having an outlet 22a registering with said ventilator. Moreover, the hood 22 has a downwardly directed inlet 22b, which defines the extent of the cleaning zone Z below.

When the harvesting machine works in high yield conditions, the conveyor 9 may have to convey a flow of harvested crop with a substantial height and density, wherein different materials are in particular piled up on each other, materials to be extracted by suction, for example leaves L, being jammed under detached fruit F and/or bunches.

Thus, with a flow of harvested crop with such important height and density, the conveyor 9 may perform an incorrect discharge at the downstream end thereof, in particular in irregular and very compact piles of materials wherein materials to be extracted by suction may be jammed as explained hereinabove, which can affect the quality of the cleaning process performed by the suction cleaning unit 10, and thus the general quality of the crop.

To avoid these drawbacks, the cleaning system further comprises at least two conveying rolls 11a, 11b, which are disposed behind the downstream end of the conveyor in an upstream part Za of the cleaning zone Z, in order to be fed with the flow of harvested crop discharged from the conveyor 9, said conveying rolls being arranged to convey said crop flow and to discharge it into a downstream part Zb of the cleaning zone. In particular, passages P are formed between or through the rolls 11a, 11b, which allows the passage of an upward air flow A through these passages P, in particular into the upstream part Za of the cleaning zone Z, for extracting residues L from the crop present on the conveying rolls 11a, 11b. The arrangement of the passages P further generates turbulences within the air flow A passing through them, thereby improving the extraction capacity of leaves L and other residues by said air flow.

More precisely, when discharged by the conveyor 9 on the rolls 11a, 11b, the flow of harvested crop is engaged by the air flow A passing through said rolls, and more particularly by the turbulences of said air flow, which allows to separate the materials within the flow of harvested crop from each other, and especially to loosen the light residues, such as leaves L, for facilitating their extraction by the suction cleaning unit 10.

The arrangement of the rolls 11a, 11b directly under the suction cleaning unit 10 reduces the amount of leaves L that still need to be extracted during their passage through the downstream part Zb of the cleaning zone Z. This allows to reduce the ballistic trajectory T necessary for correctly launching and cleaning the flow of harvested crop within the cleaning zone Z, and thus to reduce the speed of the conveyor 9. Moreover, in the embodiment shown on FIGS. 2a, 2b, 2c and 3, the rolls 11a, 11b are disposed in the continuity of the conveyor 9 and are arranged to convey the flow of harvested crop along a direction which is substantially the same as the direction L1 of the conveyor 9, which allows to keep the conventional implementation of the conveyor 9 and/or of a possible second conveyor 17 to be fed with the flow of harvested crop discharged by the conveyor 9.

In the embodiment shown on FIGS. 2a, 2b, 2c and 3, the conveying rolls 11a, 11b comprise an upstream conveying roll 11a and a downstream conveying roll 11b, the upstream conveying roll 11a being disposed in the continuity of the conveyor 9 while forming passages P' between the conveyor 9 and the upstream roll 11a, said passages being also arranged to allow the passage of an upward air flow A therethrough for extracting residues L from the crop moving from said conveyor to said upstream roll. In particular, the passages are arranged to allow the generation of a turbulent air flow A therethrough, in order to improve the extraction capacity of residues L by said air flow.

For forming air passages P, P', the upstream conveying roll 11a is disposed in axially spaced relationship with both the downstream conveying roll 11b and the conveyor 9, in order to provide in between axial clearances 12a, 12b which are part of the respective air passages P', P.

Moreover, at least one of the conveying rolls 11a, 11b may have recesses 13a, 13b also forming part of the air passages P, P' between the conveying rolls 11a, 11b and/or between the upstream conveying roll 11a and the conveyor 9.

To this end, the at least one conveying roll 11a, 11b may comprise a shaft 14a, 14b on which a plurality of disks 15a, 15b are mounted in axially spaced relationship in order to form the recesses 13a, 13b therebetween.

In particular, two adjacent conveying rolls 11a, 11b, i.e., both the upstream 11a and downstream 11b rolls in the embodiment shown, comprise a plurality of disks 15a, 15b forming recesses 13a, 13b therebetween, said adjacent conveying rolls being disposed relative to each other so that air passages P, P' are formed through said recesses.

To this end, as shown in FIGS. 2a, 2b and 2c, the upstream 11a and downstream 11b conveying rolls are arranged so that the disks 15a, 15b of one conveying roll 11a, 11b are disposed with clearance 12b axially opposite of the recesses 13a, 13b of the other conveying roll 11b, 11a in order to form air passages P therebetween.

In the embodiment shown, the outer periphery of at least one conveying roll 11a, 11b, and in particular both conveying rolls 11a, 11b, generally presents a geometry of revolution around its own rotation axis. Moreover, the periphery of each conveying roll 11a, 11b presents axial or spiral grooves 16a, 16b to improve the conveyance of the flow of harvested crop by said conveying rolls.

According to another embodiment (not shown), the periphery of at least one conveying roll 11a, 11b may comprise means to interact with the flow of harvested crop in order to achieve agitation of said crop flow by said roll. To this end, the interacting means may for example comprise protrusions formed on the periphery of the at least one conveying roll 11*a*, 11*b*.

The conveying rolls 11*a*, 11*b* may each be driven in rotation, in particular at the same rotation speed, and especially at a tangential speed that is greater than the transport speed of the conveyor 9, which provides for the acceleration of the flow of harvesting crop upon its transition from said conveyor to said rolls.

Moreover, as represented in FIGS. 2*a*, 2*b* and 2*c*, the upstream conveying roll 11*a* presents a nominal diameter that is greater than the nominal diameter of the downstream conveying roll 11*b*, so that, when the conveying rolls 11*a*, 11*b* are driven at the same rotational speed, the downstream conveying roll 11*b* presents a tangential speed that is lower than the tangential speed of the upstream conveying roll 11*a*, which decelerates the flow of harvested crop on said downstream conveying roll, and then shortens the ballistic trajectory T of said crop flow when launched by said downstream conveying roll.

It will be clear that the trajectory T of the crop flow can be modified by varying the rotation speed of one of both of the conveying rolls 11*a* and 11*b*. Such modification may also be realized by installing conveying rolls of different nominal diameters. Trajectory changes may be needed to accommodate for changing harvest conditions, including but not limited to grape or berry type, humidity and temperature during harvest and abundance of stray leaves and other MOG.

With reference to FIGS. 2*a*, 2*b*, 2*c* and 3, the cleaning system is included in an assembly embedded on the upper portion of the support structure 1 for processing a flow of harvested crop before its storage, in particular for removing from said flow material other than fruit F which was not extracted by suction, and thus to improve all the more the general quality of the crop.

The processing assembly further comprises a second conveyor 17 provided underneath the cleaning zone Z and which is arranged to convey the crop flow that was cleaned just before by the suction cleaning unit 10 along a direction L2 different from the conveying directions L1 of the conveyor 9.

In particular, the flow of harvested crop is transferred from the conveying rolls 11*a*, 11*b* onto the second conveyor 17 by ballistic effect. To this end, the second conveyor 17 is arranged under the discharge zone of the downstream conveying roll 11*b* and receives the flow of harvested crop fed thereto along a ballistic trajectory T imparted by the downstream roll 11*b*.

For the harvesting of fruit F growing in bunches, especially in the context of vinification, the processing assembly comprises a destemming unit 18, which is arranged downstream of the suction cleaning unit 10 for destemming the bunches contained in the cleaned flow of harvested crop, i.e., to remove the stalks by which the berries of the fruit F were attached to the bunches and to store only said berries and the juice.

To this end, the destemming unit 18 can comprise motorized rotary members (not shown), each of said rotary members including paddles which are adapted, on rotation of said rotary members, to interact with the flow of harvested crop in order to separate the berries of the fruit F attached to bunches.

Moreover, the second conveyor 17 is part of the destemming unit 18, and comprises in particular a mesh of the destemming unit 18, so as to allow directly the processing by said destemming unit of the flow of harvested crop that was processed just before by the suction cleaning unit 10.

In relation to FIGS. 2*a*, 2*b*, 2*c* and 3, the first conveyor 9 comprises an impervious conveyor belt, which allows to conserve the integrity of the flow of harvested crop and to avoid loss of valuable material in said flow, especially the juice and/or the detached fruit F with smallest sizes, during the conveying of said crop flow along said first conveyor. Further, as represented in particular in FIGS. 1, 2*a*, 2*b* and 3, a storage hopper 8 is provided under the zone extending between the downstream end of the first conveyor 9 and the conveying rolls 11*a*, 11*b* for recovering in particular the juice and small loose berries that may run through passages P, P' during the discharge of the flow of harvested crop within the cleaning zone Z.

Moreover, the first conveyor 9 is arranged to convey the flow of harvested crop along an upward slope, and comprises curved ribs 19 which extend substantially perpendicularly to its conveying direction L1 for retaining the materials of the flow, and in particular the juice, on said conveyor during the conveying displacement of said flow along said conveyor.

The second conveyor 17 acts as a sieve and comprises meshes or openings 20 that are adapted to allow the juice and/or the detached berries of the fruit F to pass through them, in particular to be recovered within a storage hopper 8 provided under said second conveyor, while keeping only the larger crop portions such as bunches in the flow of harvested crop, as to avoid the reprocessing of the already detached berries by the paddles of the destemming unit 18.

The conveying direction L2 of the second conveyor 17 may by in particular substantially perpendicular to the conveying direction of the conveying rolls 11*a*, 11*b*, and then to the conveying direction L1 of the conveyor 9 in the present case.

To that effect, in the embodiment shown on the figures, the conveying rolls 11*a*, 11*b* and the conveyor 9 convey the crop along a common direction L1 which is perpendicular to the travelling direction M of the harvesting machine, in particular by being arranged in a transverse section plane of said harvesting machine, and the second conveyor 17 conveys the crop along a second direction L2 which is parallel to said travelling direction, in particular by being arranged in a longitudinal section plane of said harvesting machine that also comprises said travelling direction.

The invention claimed is:

1. A system for cleaning a flow of harvested crop, the system comprising:
    a cleaning zone having an upstream part and a downstream part;
    a conveyor arranged to convey the flow downstream of the conveyor into the cleaning zone into which the flow is intended to be discharged, the conveyor having a downstream end;
    a suction cleaning unit located above the cleaning zone and operable to generate an upward air flow through the cleaning zone for extracting residues contained in the discharged flow; and
    at least two conveying rolls disposed behind the downstream end of the conveyor in the upstream part of the cleaning zone in order to be fed with the flow of harvested crop discharged from the conveyor, the at least two conveying rolls and the conveyor conveying the harvested crop in a common direction, the at least two conveying rolls arranged to convey the crop flow and to discharge it into the downstream part of the cleaning zone, wherein passages are formed between or through the at least two conveying rolls, the passages being arranged to allow the upward air flow therethrough for extracting residues from crop present on the at least two conveying rolls, the flow of harvested crop leaving the conveyor being engaged by the upward air flow passing through the conveying rolls, and wherein the at least two conveying rolls are arranged directly under the suction cleaning unit.

2. The system according to claim 1, wherein the passages are arranged to generate turbulences within the upward air flow passing through them to improve extraction capacity of residues by the air flow.

3. The system according to claim 1, wherein the at least two conveying rolls are disposed in axially spaced relationship to provide in between axial clearance which is part of the passages.

4. The system according to claim 1, wherein the at least two conveying rolls comprise an upstream conveying roll which is disposed in continuity with the conveyor while forming passages between the conveyor and the upstream roll, the passages between the conveyor and the upstream roll arranged to allow the upward air flow therethrough for extracting residues from the crop moving from the conveyor to the upstream roll.

5. The system according to claim 4, wherein the upstream conveying roll is disposed in axially spaced relationship with the conveyor to provide therebetween axial clearance which is part of the passages between the conveyor and the upstream roll.

6. The system according to claim 1, wherein the conveyor comprises an impervious belt.

7. The system according to claim 1, wherein at least one of the at least two conveying rolls presents recesses forming part of the passages between the at least two conveying rolls.

8. The system according to claim 7, wherein the at least two conveying rolls comprise an upstream conveying roll which is disposed in continuity of the conveyor while forming passages between the conveyor and the upstream roll, the passages between the conveyor and the upstream roll arranged to allow the upward air flow therethrough for extracting residues from the crop moving from the conveyor to the upstream roll, and wherein the recesses form part of the passages between the upstream conveying roll and the conveyor.

9. The system according to claim 7, wherein the at least one of the at least two conveying rolls comprises a shaft on which a plurality of disks are mounted in axially spaced relationship in order to form the recesses therebetween.

10. The system according to claim 9, wherein each of adjacent ones of the at least two conveying rolls comprises a plurality of disks forming the recesses therebetween, the adjacent ones disposed relative to each other so that air passages are formed through the recesses.

11. The system according to claim 10, wherein the adjacent ones are arranged so that disks of one of the conveying rolls are disposed with clearance axially opposite of recesses of another one of the at least two conveying rolls to form air passages therebetween.

12. The system according to claim 1, wherein the at least two conveying rolls comprise an upstream conveying roll and a downstream conveying roll, the upstream conveying roll presenting a nominal diameter that is greater than a nominal diameter of the downstream conveying roll.

13. The system according to claim 1, characterized in that the at least two conveying rolls are driven in rotation at a same rotation speed.

14. The system according to claim 1, wherein at least one of the at least two conveying rolls presents a geometry that is substantially a geometry of revolution around a rotational axis of the at least one of the at least two conveying rolls.

15. The system according to claim 14, wherein the geometry of revolution presents grooves to improve the conveying of the flow of harvested crop by the at least two conveying rolls.

16. The system according to claim 1, wherein a periphery of at least one of the at least two conveying rolls comprises protrusions to interact with and to agitate the flow of harvested crop.

17. An assembly for processing a flow of harvested crop, the assembly comprising a system for cleaning the harvested crop according to claim 1, the system further comprising a second conveyor disposed underneath the cleaning zone and which is arranged to convey the cleaned crop flow along a direction different from a conveying direction of the conveyor.

18. The assembly according to claim 17, the system further comprising a destemming unit, the second conveyor being part of the destemming unit.

19. A harvesting machine comprising a harvesting unit, and a system according to claim 1 for cleaning a flow of harvested crop provided by the harvesting unit.

* * * * *